US011166866B2

(12) United States Patent
Ye et al.

(10) Patent No.: US 11,166,866 B2
(45) Date of Patent: Nov. 9, 2021

(54) LOWER LIMB TRAINING REHABILITATION APPARATUS

(71) Applicants: SHENZHEN HANIX UNITED, LTD., Guangdong (CN); SHENZHEN MILEBOT ROBOTICS CO., LTD., Guangdong (CN)

(72) Inventors: Jing Ye, Guangdong (CN); Gong Chen, Guangdong (CN); Feng Xu, Guangdong (CN); Lv Jiang, Guangdong (CN); Jialin Feng, Guangdong (CN); Xu Zhang, Guangdong (CN); Guang Hu, Guangdong (CN); Shiheng Liu, Guangdong (CN); Yongkui Li, Guangdong (CN)

(73) Assignees: SHENZHEN HANIX UNITED, LTD., Shenzhen (CN); SHENZHEN MILEBOT ROBOTICS CO., LTD., Shenzhen (CN)

( * ) Notice: Subject to any disclaimer, the term of this patent is extended or adjusted under 35 U.S.C. 154(b) by 84 days.

(21) Appl. No.: 16/469,649

(22) PCT Filed: Mar. 12, 2018

(86) PCT No.: PCT/CN2018/078705
§ 371 (c)(1),
(2) Date: Jun. 14, 2019

(87) PCT Pub. No.: WO2018/233322
PCT Pub. Date: Dec. 27, 2018

(65) Prior Publication Data
US 2020/0100977 A1    Apr. 2, 2020

(30) Foreign Application Priority Data

Jun. 20, 2017 (CN) .......................... 201710471494.5

(51) Int. Cl.
*A61H 3/00* (2006.01)
*A63B 21/00* (2006.01)
(Continued)

(52) U.S. Cl.
CPC ........... *A61H 3/008* (2013.01); *A61H 1/0262* (2013.01); *A63B 21/4035* (2015.10);
(Continued)

(58) Field of Classification Search
CPC .................. A61H 3/008; A61H 1/0262; A61H 2201/1261; A61H 2201/14;
(Continued)

(56) References Cited

U.S. PATENT DOCUMENTS 4,620,703 A * 11/1986 Greenhut ........... A63B 21/0056
482/114
4,635,875 A * 1/1987 Apple ...................... B66D 1/36
242/155 BW
(Continued)

*Primary Examiner* — Garrett K Atkinson

(57) ABSTRACT

A lower limb training rehabilitation apparatus, comprising a weight reducing device, a pelvis supporting device, an exoskeleton device, a control system for controlling mechanical movements of the rehabilitation apparatus, and a treadmill used for walking of a patient. The rehabilitation apparatus hoists the upper body of the patient by means of the weight reducing device, then fixes the crotch of the patient to the pelvis supporting device, and fixes two legs of the patient to two mechanical legs of the exoskeleton device. A power source drives the pelvis supporting device to move up and down, so that the patient can move in the vertical direction; in addition, a sliding base of the pelvis supporting device can assist the patient in moving left and right, swinging left and right, and twisting. The mechanical legs and the treadmill together implement arbitrary movements in six degrees of freedom of the patient.

10 Claims, 7 Drawing Sheets

(51) Int. Cl.
*A61H 1/02* (2006.01)
*A63B 22/02* (2006.01)

(52) U.S. Cl.
CPC ...... *A63B 22/02* (2013.01); *A61H 2201/1261* (2013.01); *A61H 2201/14* (2013.01); *A61H 2201/5007* (2013.01); *A61H 2201/5043* (2013.01)

(58) Field of Classification Search
CPC .... A61H 2201/5007; A61H 2201/5043; A61H 2201/1207; A61H 2201/123; A61H 2201/163; A61H 2201/1642; A61H 2201/1652; A61H 2201/5061; A61H 2201/5064; A61H 1/0255; A61H 1/0237; A61H 2201/0192; A61H 2201/1664; A61H 2201/1164; A63B 21/4035; A63B 22/02; A63B 2220/10; A63B 2220/51; A63B 21/00178; A63B 21/00181; A63B 22/0235; A63B 24/0062; A63B 24/0087; A63B 69/0057; A63B 69/0064; A63B 21/4011; A63B 69/0028; A63B 22/0046; A63B 22/007; A63B 2024/0093
See application file for complete search history.

(56) References Cited

U.S. PATENT DOCUMENTS

| | | | | |
|---|---|---|---|---|
| 4,724,827 A * | 2/1988 | Schenck | | A61H 1/0288 |
| | | | | 601/40 |
| 5,667,461 A * | 9/1997 | Hall | | A61H 1/0229 |
| | | | | 472/15 |
| 6,123,649 A * | 9/2000 | Lee | | A63B 21/153 |
| | | | | 482/51 |
| 6,666,831 B1 * | 12/2003 | Edgerton | | A61H 1/0237 |
| | | | | 600/587 |
| 6,796,926 B2 * | 9/2004 | Reinkensmeyer | ... | A61B 5/1038 |
| | | | | 482/51 |
| 7,331,906 B2 * | 2/2008 | He | | A61H 1/0237 |
| | | | | 482/69 |
| 7,494,450 B2 * | 2/2009 | Solomon | | A61H 1/0229 |
| | | | | 482/51 |
| 7,887,471 B2 * | 2/2011 | McSorley | | A63B 23/0355 |
| | | | | 482/138 |
| 7,998,040 B2 * | 8/2011 | Kram | | A63B 21/4013 |
| | | | | 482/124 |
| 8,057,410 B2 * | 11/2011 | Angold | | A61H 3/008 |
| | | | | 601/5 |
| 8,152,699 B1 * | 4/2012 | Ma | | A63B 21/4011 |
| | | | | 482/69 |
| 8,608,479 B2 * | 12/2013 | Liu | | A61H 3/008 |
| | | | | 434/255 |
| 9,638,163 B2 * | 5/2017 | Holloway | | B66D 1/36 |
| 9,789,023 B1 * | 10/2017 | Lee | | A63B 24/0021 |
| 10,292,892 B2 * | 5/2019 | Lee | | A61H 3/00 |
| 10,406,059 B2 * | 9/2019 | Agrawal | | A61B 5/1121 |
| 10,434,027 B2 * | 10/2019 | Lee | | A61F 2/72 |
| 10,449,107 B2 * | 10/2019 | Maekita | | A61H 1/024 |
| 10,465,663 B2 * | 11/2019 | Holloway | | B66C 1/66 |
| 10,870,033 B2 * | 12/2020 | Johnson | | A63B 22/203 |
| 2003/0064869 A1 | 4/2003 | Reinkensmeyer | ..... | A61H 3/008 |
| | | | | 482/100 |
| 2004/0087418 A1 * | 5/2004 | Eldridge | | A63B 21/157 |
| | | | | 482/54 |
| 2004/0116839 A1 * | 6/2004 | Sarkodie-Gyan | ...... | A61H 3/008 |
| | | | | 601/35 |
| 2004/0204294 A2 * | 10/2004 | Wilkinson | ....... | A63B 23/03525 |
| | | | | 482/54 |
| 2005/0101448 A1 * | 5/2005 | He | | A63B 22/02 |
| | | | | 482/54 |
| 2008/0300118 A1 * | 12/2008 | Wehrell | | A63B 23/047 |
| | | | | 482/129 |
| 2012/0004581 A1 * | 1/2012 | Dinon | | A61H 1/0255 |
| | | | | 601/23 |
| 2013/0130866 A1 * | 5/2013 | Wehrell | | A63B 21/00065 |
| | | | | 482/5 |
| 2013/0184128 A1 * | 7/2013 | Towley, III | | A63B 21/156 |
| | | | | 482/102 |
| 2013/0225371 A1 * | 8/2013 | Harrer | | A63B 21/16 |
| | | | | 482/8 |
| 2014/0121071 A1 * | 5/2014 | Strom | | A63B 21/156 |
| | | | | 482/99 |
| 2014/0378279 A1 * | 12/2014 | Park | | A63B 22/0235 |
| | | | | 482/54 |
| 2015/0232307 A1 * | 8/2015 | Holloway | | F03D 80/50 |
| | | | | 414/800 |
| 2015/0272809 A1 * | 10/2015 | Accoto | | A61H 1/0237 |
| | | | | 623/31 |
| 2015/0297934 A1 * | 10/2015 | Agrawal | | A61H 1/0266 |
| | | | | 482/4 |
| 2017/0027803 A1 * | 2/2017 | Agrawal | | A61B 5/224 |
| 2017/0056275 A1 * | 3/2017 | Lee | | A61F 2/72 |
| 2017/0218927 A1 * | 8/2017 | Holloway | | B66D 1/36 |
| 2017/0326407 A1 * | 11/2017 | Johnson | | A63B 22/02 |
| 2018/0071580 A1 * | 3/2018 | Lee | | A61H 3/00 |
| 2018/0125738 A1 * | 5/2018 | Witte | | A61H 1/0266 |
| 2018/0360685 A1 * | 12/2018 | Huang | | A61H 3/00 |
| 2018/0369053 A1 * | 12/2018 | Lukashevich | | A63B 23/00 |

\* cited by examiner

LOWER LIMB TRAINING REHABILITATION APPARATUS

TECHNICAL FIELD

The present disclosure relates to the field of medical apparatus, and in particular relates to a lower limb training rehabilitation apparatus.

BACKGROUND

Population aging has gradually become a global trend, and for the elderly, cerebrovascular and neurological diseases can cause a lower limb dysfunction. In addition to affecting their everyday life, the patient also suffers from a great psychological trauma, which seriously affects physical and mental health thereof. Therefore, how to recover the exercise capacity of the patient in a maximum extent is an important part of the clinical rehabilitation therapy.

The study on a lower limb rehabilitation equipment has already been carried out abroad, and relatively mature products have been developed so far. Lokomat is a lower limb rehabilitation equipment invented by Swiss engineer Jerry Colombo, is also the first lower limb rehabilitation medical equipment in the world, and is used for providing a rehabilitation training for the patient with lower limb paralysis. It mainly consists of a lower limb exoskeleton, a support system for reducing a body weight and a belt movement platform, and a decompression plate therapy is used to gradually match the gait of the patient with the gait of normal walking.

The lower limb rehabilitation equipment started later in domestic, and the existing representative similar products mainly consist of an exoskeleton orthosis fixing the hip and two lower limbs, a weight reduction system and a medical treadmill. The parameters, such as a range of motion of the hip and knee joints, a gait offset, a guiding force of the two lower limbs and the speed of movement and the like, are controlled by a computer in real time. The therapist is required to fully understand a lower limb rehabilitation robot training and evaluation system, and continuously adjusts the training parameters according to the condition of movement function of the patient.

However, whether it is a domestic or foreign rehabilitation equipment, it also suffers certain limitations in the practical applications. The above-mentioned rehabilitation equipment only provides a single movement path of a predetermined sagittal plane (i.e., a fore-and-aft direction of the human body), and the existing rehabilitation equipment fixes the patient on a platform, which limits the spatial movement of the pelvis. Due to the lack of a feedback of a movement in all directions and a sensory movement, it will lead to a single movement habit, and eventually it will be easy to form an abnormal gait.

SUMMARY

The technical problem to be solved by the present disclosure is to provide a lower limb training rehabilitation apparatus, which aims to solve the problem of the lower limb training rehabilitation apparatus in the prior art that cannot satisfy the movement of the patient in all directions.

In order to solve the above technical problem, the present disclosure is achieved by a lower limb training rehabilitation apparatus, which comprises:

a control system for controlling a mechanical movement of the rehabilitation apparatus and a treadmill for the walking of a patient;

a weight reducing device comprising a vertical rail and a power source, the power source is electrically connected with the control system, the vertical rail is located at one side of the treadmill, and a hanging plate protrudes from a side close to the treadmill on the top of the vertical rail;

a pelvis supporting device mounted below the hanging plate and comprising a base, a sliding base, a rotatable guide rail and a pelvis support, the base is mounted on the vertical rail and connected with an output of the power source, the control system controls the power source to drive the base to reciprocate along the vertical rail; the sliding base is horizontally mounted on the top of the base and movable in a direction perpendicular to left and right sides of the treadmill, the sliding base is symmetrically provided with the first resilient return element along both sides of a horizontal moving direction thereof, a rotational shaft is disposed on the sliding base in a fore-and-aft direction parallel to the treadmill and the rotational shaft is rotatable about an axis thereof, the center of the rotatable guide rail is rotatably mounted on the rotational shaft about a vertical direction and the second resilient return element is symmetrically provided at the bottom of the rotatable guide rail, the pelvis support is relatively rotatably mounted on the rotatable guide rail about the vertical direction and is always parallel to a fore-and-aft direction of the treadmill; and an exoskeleton device comprising two mechanical legs, the top of the two mechanical legs are rotatably mounted on two sides of the pelvis support about a direction perpendicular to left and right sides of the treadmill respectively.

Further, a boss is fixed on the top of the rotational shaft, a pivot socket is disposed on the top of the boss, and the center of the rotatable guide rail is pivotally mounted within the pivot socket of the boss about the vertical direction.

Further, two said bosses are provided on the rotational shaft and a direction of a connecting line of the two bosses is parallel to an axis of the rotational shaft, the rotatable guide rail comprises the first rotatable guide rail and the second rotatable guide rail parallel with each other, and the center of the first rotatable guide rail and the center of the second rotatable guide rail are rotatably disposed within pivot sockets of the two bosses about the vertical direction respectively.

Further, two sliders are respectively disposed on the first rotatable guide rail and the second rotatable guide rail, one slider on the first rotatable guide rail and one slider on the second rotatable guide rail form the first group of sliders, and the other slider on the first rotatable guide rail and the other slider on the second rotatable guide rail form the second group of sliders, the pelvis support comprises two mutually parallel hip lateral brackets and two mutually parallel fixing rods. Two rotational receivers, which are rotatable about the vertical direction, are disposed on the top of each of the hip lateral brackets. The two hip lateral brackets are relatively rotatably mounted on the first group of sliders and the second group of sliders about the vertical direction. The first fixing plate and the second fixing plate for limiting the relative position of the two fixing rods are respectively fixed at the center of the first rotatable guide rail and the center of the second rotatable guide rail. Two ends of each of the two fixing rods are respectively disposed in the rotational receivers above the two mutually parallel hip lateral brackets therethrough, and middle portions of the two fixing rods respectively pass through and are limited in the first fixing plate and the second fixing plate, thereby together forming a parallelogram structure.

Further, a gear set is provided on each of the first fixing plate and the second fixing plate, the two fixing rods are guide screws, the two ends of the guide screws are provided with reverse threads, and the guide screws are smooth round rods in the middle portions thereof. A threaded through hole is formed in the rotational receiver, the first bevel gear is fixed on the smooth round rod in the middle portion of each of the two guide screws, the two ends of the two guide screws are respectively screwed with the rotational receiver, the middle portions of the two guide screws respectively pass through the first fixing plate and the second fixing plate, and the first bevel gears on the two guide screws are respectively in mesh with the gear sets on the first fixing plate and the second fixing plate, the gear sets on the two fixed plates are drivingly connected by a gear belt.

Further, a crank handle is fixed to one end of one guide screw of the two guide screws.

Further, the rehabilitation apparatus further comprises the first rotary encoder, the second rotary encoder, a linear encoder and a tension-pressure sensor for detecting a force applied to the pelvic support device by the patient. The first rotary encoder is mounted on one side of the rotational shaft, the second rotary encoder is disposed between the first rotatable guide rail and the second rotatable guide rail and drivingly connected to the gear sets on the two fixed plates, the linear encoder is mounted on one side of the sliding base, and the tension-pressure sensor is provided on the sliding base. The first rotary encoder, the second rotary encoder, the linear encoder and the tension-pressure sensor are electrically connected to the control system.

Further, the top of the mechanical leg has a rotary power source, the first gear plate, the second gear plate, and a rotating member. The first gear plate and the second gear plate are respectively disposed on two sides of the mechanical leg, and the first gear plate and the second gear plate are fixedly coupled. One end of the rotating member is fixed on the mechanical leg, and the other end of the rotating member is provided with the third gear plate. The second bevel gear is fixed to a power output of the rotary power source, and the second bevel gear is in mesh with the first gear plate. The second gear plate is drivingly connected to the third gear plate of the rotating member, and the rotary power source is electrically connected to the control system.

Further, the rehabilitation apparatus further comprises handrails disposed on the treadmill and located on the two sides of the treadmill.

Further, the rehabilitation device further comprises a bracing and a display for human-computer interaction, the bracing is disposed at a front end of the treadmill, and the display is fixed at the top of the bracing and faces towards a rear end of the treadmill.

The present disclosure has the following beneficial effects compared with the prior arts: a lower limb training rehabilitation apparatus of the present disclosure comprises a weight reducing device, a pelvis supporting device, an exoskeleton device, a control system for controlling a mechanical movement of the rehabilitation apparatus and a treadmill for the walking of a patient. The apparatus lifts an upper body of the patient by a hanging plate on the weight reducing device for reducing the gravity applied to the two legs for the patient, the crotch of the patient is then supported on a pelvis support of the pelvis supporting device, and the two legs of the patient are fixed to the two mechanical legs of the exoskeleton device. The pelvis supporting device can achieve an upward-and-downward movement in the vertical direction by the power source, such that the patient can move linearly in an upward-and-downward direction; the sliding base of the pelvis supporting device itself can help achieving a linear movement of the patient in a left and right direction; meanwhile, a forward and backward movement of a conveyor belt of the treadmill itself helps achieving a linear movement of the patient in the fore-and-aft direction. The rotation of the patient in the fore-and-aft direction is achieved by the rotational shaft on the sliding base, so that the patient can swing leftwards and rightwards; the rotation of the pelvis support about the vertical direction helps the user to achieve the rotation in the vertical direction, so that the crotch of the patient can be twisted; the rotation of the two mechanical(prosthetic) legs about the left and right direction of the patient helps the patient to achieve a rotation in a left and right horizontal direction, so that the patient can swing back and forth. Any movement of the patient in six degrees of freedom is thus achieved, and the pelvis support is always parallel to the fore-and-aft direction of the treadmill, so that the patient can have a clear sense of direction when moving in all directions, thereby helping the patient to recover the lower limb function more quickly, and helping the walking posture to be closer to a normal gait.

DETAILED DESCRIPTION

In order to make the aim, the technical solution and the advantages of the present disclosure to be more apparent, the present disclosure will be further described in detail hereinafter in conjunction with the accompanying drawings and embodiments. It should be understood that, the specific embodiments described herein are merely intended to explain the present disclosure and are not intended to limit the present disclosure.

Figure 1:
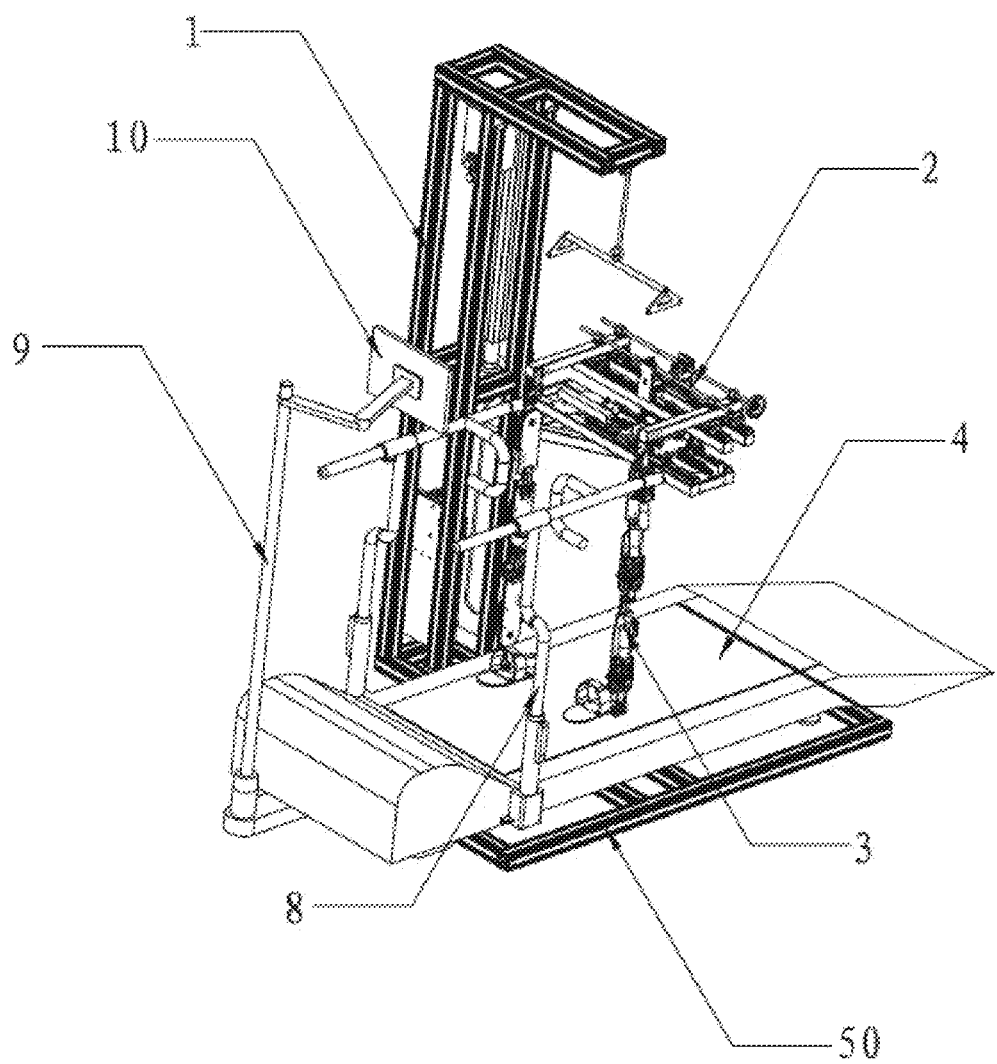
FIG. 1 is an overall schematic structural view of a lower limb training rehabilitation apparatus provided by an embodiment of the present disclosure.

As shown in FIG. 1, a lower limb training rehabilitation apparatus 100 provided by an embodiment of the present disclosure is shown, which comprises a weight reducing device 1, a pelvis supporting device 2, an exoskeleton device 3, a treadmill 4 and a control system (not shown). The weight reducing device 1 is used to reduce the gravity force applied to two legs by an upper body of a patient; the pelvis supporting device 2 is used to support a crotch of the patient and to achieve a movement of the patient in four degrees of freedom; the exoskeleton device 3 is used to fix the two legs of the patient and allows the patient to swing back and forth; the control system is used to control a mechanical movement of the rehabilitation apparatus 100, and the treadmill 4 is used for the walking of the patient.

Figure 2:
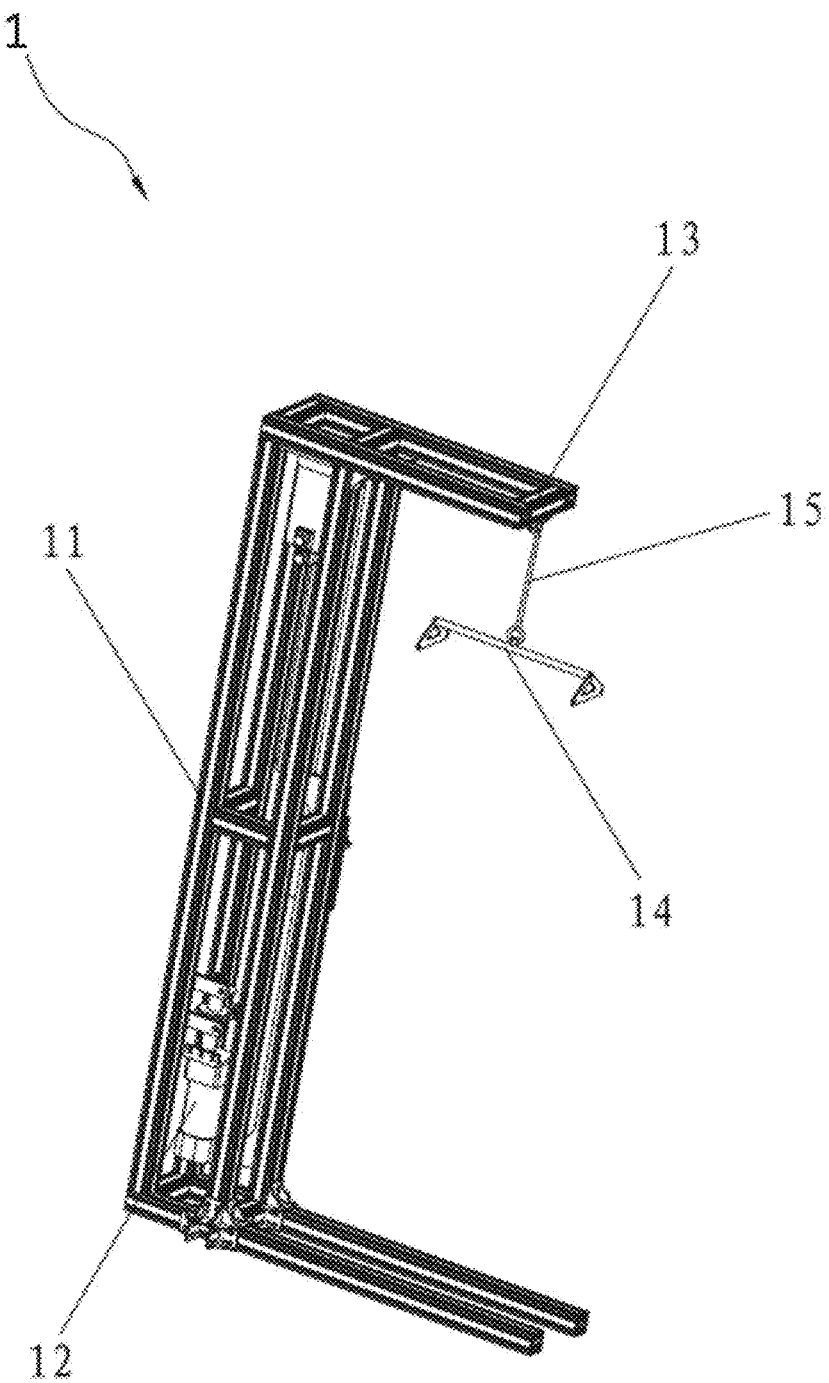
FIG. 2 is a schematic structural view of a weight reducing device of FIG. 1.

In particular, with reference to FIG. 2, the weight reducing device 1 comprises a vertical rail 11 and a power source 12. The power source 12 is electrically connected with the control system, and the power source 12 can be a motor or a cylinder. The vertical rail 11 is located at one side of the treadmill 4, and a hanging plate 13 protrudes from a side close to the treadmill on the top of the vertical rail 11 and a hanging bracket 14 is suspended below the hanging plate 13. The upper body of the patient is lifted by the hanging bracket 14 cooperating with a sling 15, and the pelvis supporting device 2 is located below the hanging bracket 14 and supports the crotch of the patient, so as to reduce the gravity force applied to the two legs by the upper body of the patient, thereby facilitating the walking of the patient.

Figure 3:
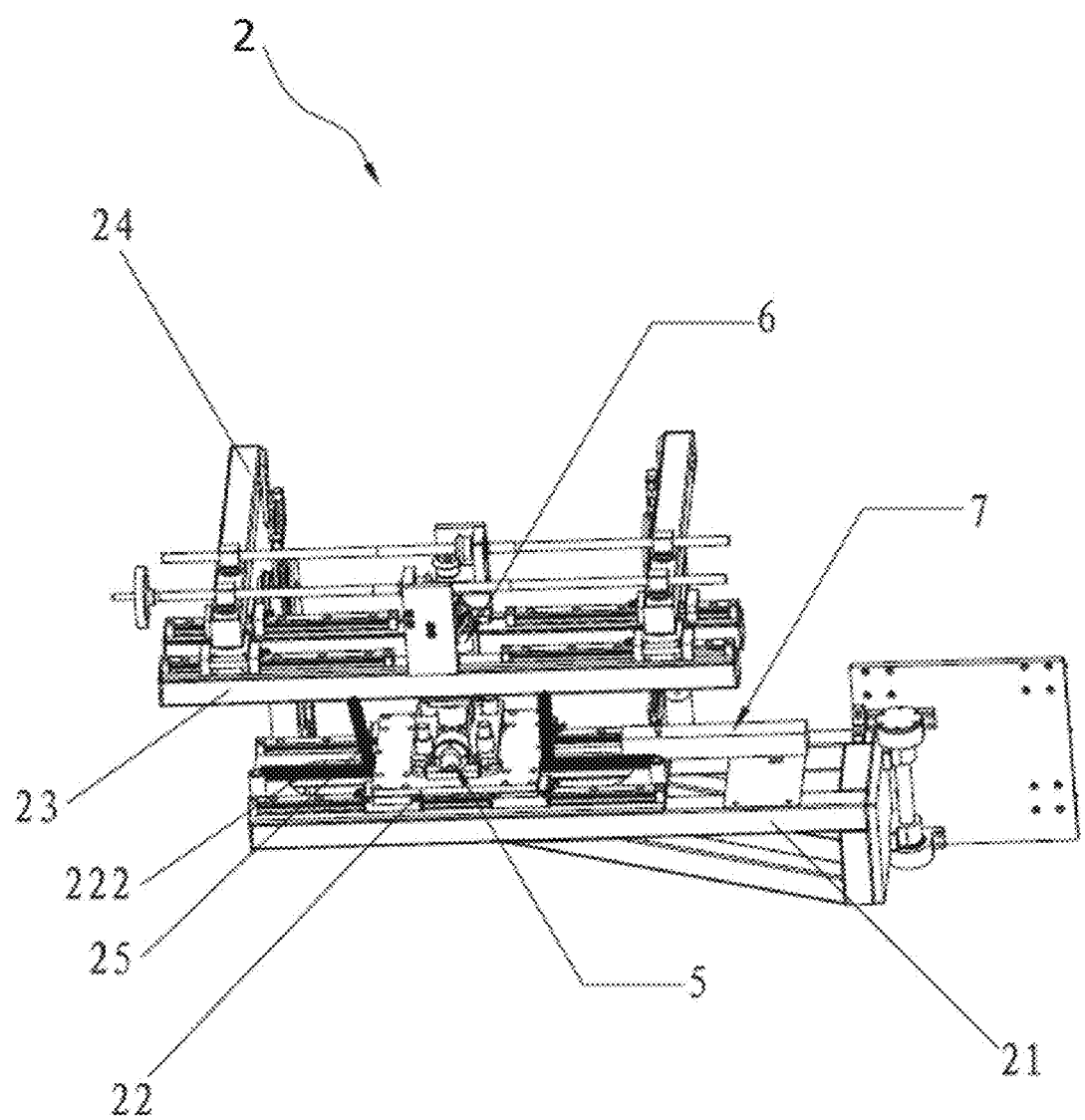
FIG. 3 is a schematic structural view of a pelvis supporting device of FIG. 1.
Figure 4:
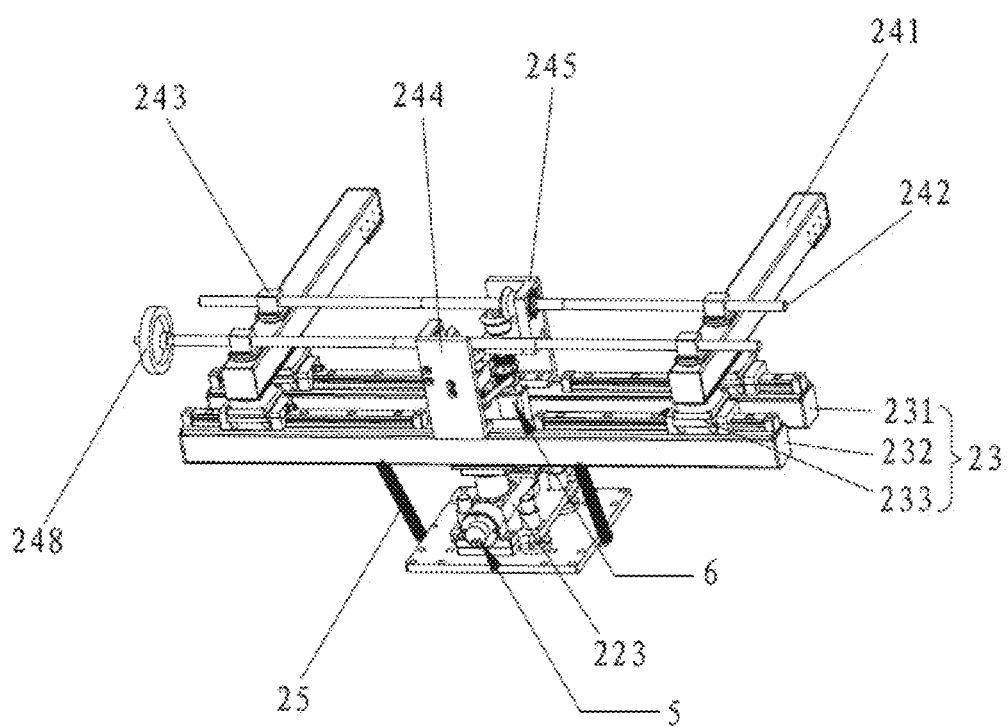
FIG. 4 is a schematic structural view of a sliding base, a rotatable guide rail and a pelvis support of FIG. 3.

With reference to FIGS. 3 and 4, the pelvis supporting device 2 comprises a base 21, a sliding base 22, a rotatable guide rail 23 and a pelvis support 24. The base 21 is configured to enable the movement of the patient in an upward-and-downward direction; the sliding base 22 is mounted on the base 21 for enabling a shift of the patient in a left and right direction and a left and right swing; the rotatable guide rail 23 is mounted on the sliding base 22 for enabling a rotation of the patient about a vertical direction, such that the crotch of the patient can be twisted; the pelvis support 24 is mounted on the rotatable guide rail 23 for supporting the crotch of the patient. The pelvis supporting device 2 can achieve a movement of the patient in four degrees of freedom in total.

In particular, the base 21 is mounted on the vertical rail 11 and connected with an output of the power source 12, and the control system controls the power source 12 to drive the base 21 to reciprocate along the vertical rail 11, thereby driving the patient to move upward and downward as a whole, such that the patient can freely move in the upward-and-downward direction. Meanwhile, with reference to FIG. 5, on the sliding base 22 is further provided a tension-pressure sensor 221 for detecting a force applied to the pelvic support device 2 by the patient, and the tension-pressure sensor 221 is electrically connected with the control system. The tension-pressure sensor 221 acquires a value of a tension and a pressure between the patient and the pelvic support device 2 in the upward-and-downward direction, and a value of pressure (for example, 20 N) can be set in advance. When the tension or pressure applied to the pelvic support device 2 by the patient is greater than 20 N, the tension-pressure sensor 221 transmits data information to the control system, and the control system controls corresponding projection or retraction of the output terminal of the power source 12, thereby performing a real-time intelligent weight reduction control on the patient.

The sliding base 22 is horizontally movably mounted on the top of the base 21 in a direction perpendicular to left and right sides of the treadmill 4, and the sliding base 22 is symmetrically provided with the first resilient return element 222 along both sides of a horizontal moving direction thereof. The horizontal movement of the sliding base 22 on the base 21 enables the patient to move freely in the left and right direction, and by means of the first resilient return element 222 on both sides of the sliding base 22, the sliding base 22 can be returned back to the original position when the sliding base 22 slides towards either side. Meanwhile, a rotational shaft 223 is disposed on the sliding base 22 in a fore-and-aft direction parallel to the treadmill 4, and the rotational shaft 223 is rotatable about a direction of axis thereof. The rotatable guide rail 23 is mounted on the rotational shaft 223. The rotatable guide rail 23 and the pelvis support 24 mounted on the rotatable guide rail 23 are rotated together by the rotation of the rotational shaft 223, and then the patient will sway leftwards and rightwards as the pelvis support 24 rotates. The patient can return to the original position when swaying to either side by providing a symmetrical second resilient return element 25 at the bottom of the rotatable guide rail 23. The movement of the patient in two degrees of freedom, i.e., the left and right movement and the left and right swaying, can be achieved by the sliding base 22.

Figure 5:
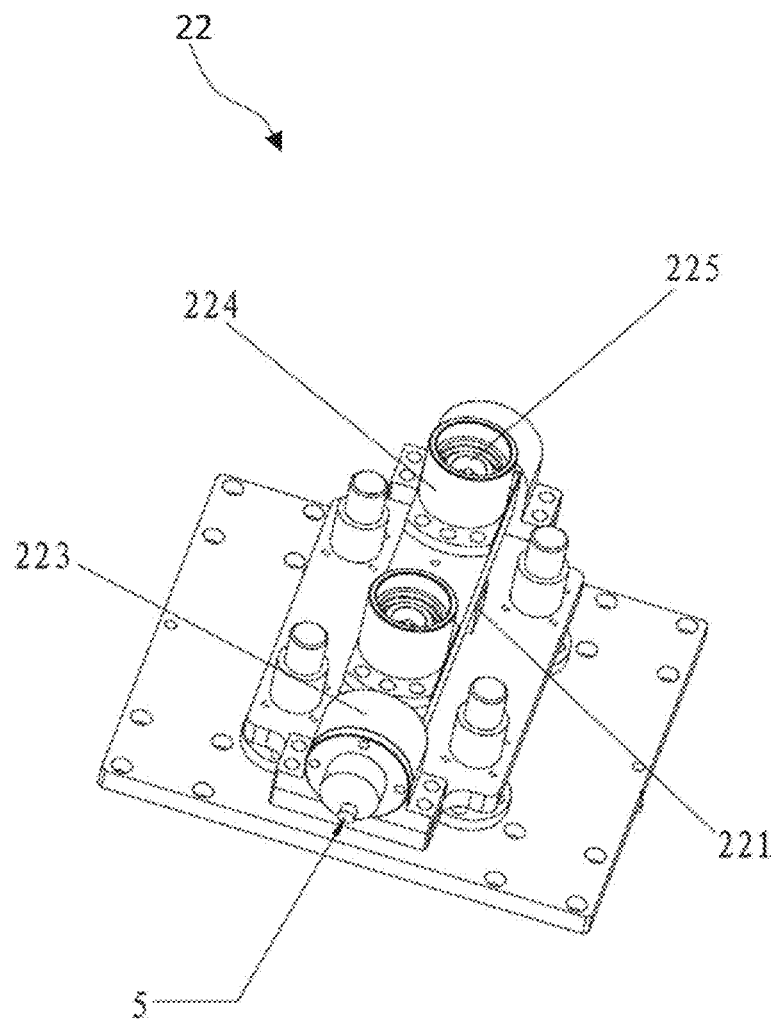
FIG. 5 is a schematic structural view of the sliding base of FIG. 3.

With reference to FIG. 5, in an embodiment of the present disclosure, two bosses (protuberances) 224 are fixed to the top of the rotational shaft 223, and a direction of a connecting line of the two bosses 224 is parallel to an axis of the rotational shaft 223. Pivot sockets 225 are disposed on the top of the bosses 224. The rotatable guide rail 23 comprises the first rotatable guide rail 231 and the second rotatable guide rail 232 parallel with each other, and the center of the first rotatable guide rail 231 and the center of the second rotatable guide rail 232 are rotatably disposed within the pivot sockets 225 of the two bosses 224 about the vertical direction respectively. The crotch of the patient can be twisted in the vertical direction by means of the rotation of the midpoints of the first rotatable guide rail 231 and the second rotatable guide rail 232 about the vertical direction.

Meanwhile, with reference to FIG. 4, two sliders 233 are respectively disposed on the first rotatable guide rail 231 and the second rotatable guide rail 232. One slider 233 on the first rotatable guide rail 231 and one slider 233 on the second rotatable guide rail 232 form the first group of sliders, and the other slider 233 on the first rotatable guide rail 231 and the other slider 233 on the second rotatable guide rail 232 form the second group of sliders. The pelvis support 24 comprises two mutually parallel hip lateral brackets 241 and two mutually parallel fixing rods 242, two rotational receiver 243, which are rotatable about the vertical direction, are disposed on the top of each of the hip lateral brackets 241, and the two hip lateral brackets 241 relatively rotatably mounted on the first group of sliders and the second group of sliders about the vertical direction. The first fixing plate 244 and the second fixing plate 245 for limiting the relative position of the two fixing rods 242 are respectively fixed at the center of the first rotatable guide rail 231 and the center of the second rotatable guide rail 231. Two ends of the two fixing rods 242 are respectively disposed in the rotational receivers 243 above the two mutually parallel hip lateral brackets 241 therethrough, and middle portions of the two fixing rods 242 respectively pass through and are limited in the first fixing plate 244 and the second fixing plate 245, thereby together forming a parallelogram structure, such that the two hip lateral brackets 241 can always face towards the front of the treadmill 4 when the first rotatable guide rail 231 and the second rotatable guide rail 232 are rotated about the vertical direction.

Figure 6:
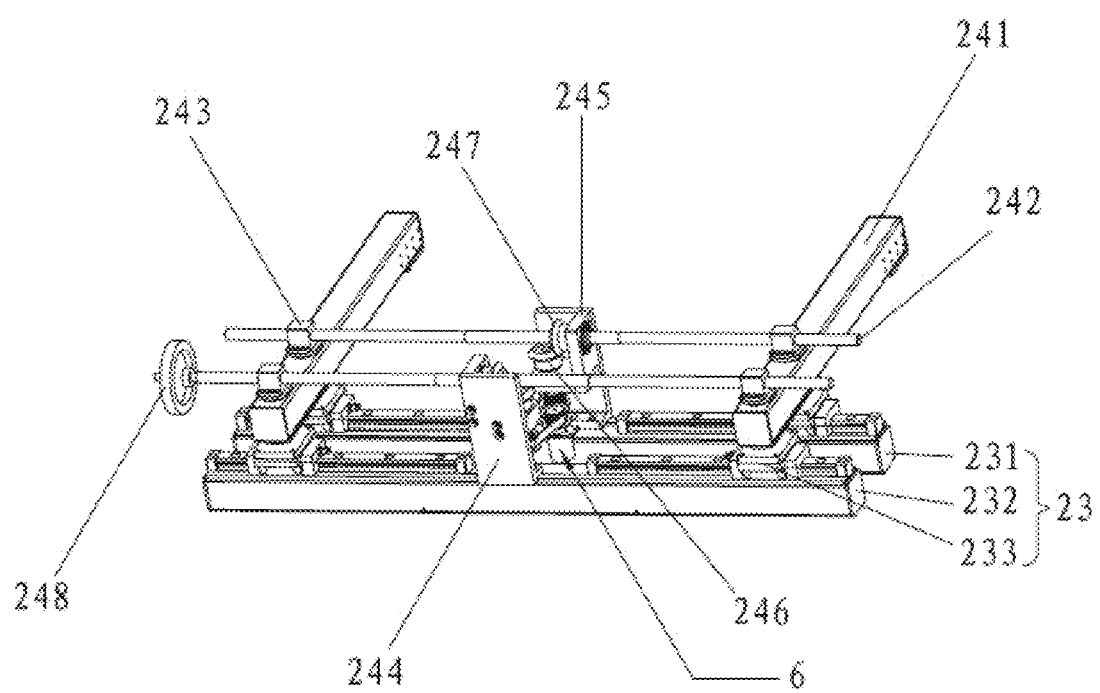
FIG. 6 is a schematic structural view of the rotatable guide rail and the pelvis support of FIG. 3.

In particular, with reference to FIG. 6, in an embodiment of the present disclosure, a gear set 246 is provided on each of the first fixing plate 244 and the second fixing plate 245, the two fixing rods 242 are both guide screws, the two ends of each of the guide screws 242 are provided with reverse threads, and the guide screws 242 are smooth round rods in the middle portions thereof, respectively. A threaded through hole is formed in the rotational receiver 243, the first bevel gear 247 is fixed on the smooth round rod in the middle portion of each of the two guide screws 242, the two ends of the two guide screws 242 are respectively screwed with the rotational receiver 243, the middle portions of the two guide screws 242 respectively pass through the first fixing plate 244 and the second fixing plate 245, the first bevel gears 247 on the two guide screws 242 are respectively in mesh with the gear sets 246 on the first fixing plate 244 and the second fixing plate 245, and the gear sets 246 on the two fixed plates are drivingly connected by a gear belt. Since the middle portions of the two guide screws 242 are respectively limited and fixed by the first fixing plate 244 and the second fixing plate 245, the two hip lateral brackets 241 are always parallel to a fore-and-aft direction of the treadmill, thereby providing the patient with a clear direction of walking.

A crank handle 248 is fixed to one end of one guide screw 242 of the two guide screws 242. Since the two ends of the guide screws 242 are reversely threaded, by rotating the crank handle 248, force can be transmitted to the gear set 246 through the first bevel gear 247 on the guide screw 242 and transmitted to the other guide screw though the gear belt, such that the two guide screws 242 are rotated at the same time to drive the two hip lateral brackets 241 to retract inwardly or expand outwardly at the same time, thereby enabling the adjustment of the width between the two hip lateral brackets 241, so as to be adaptable to various patients with different degree of fatness or thinness.

With reference to FIG. 3, the rehabilitation apparatus 100 further comprises the first rotary encoder 5, the second rotary encoder 6, and a linear encoder 7. The first rotary encoder 5 is mounted on one side of the rotational shaft 223; the second rotary encoder 6 is disposed between the first rotatable guide rail 231 and the second rotatable guide rail 232, and is drivingly connected to the gear sets 246 on the two fixed plates; and the linear encoder 7 is mounted on one side of the sliding base 22. The first rotary encoder 5, the second rotary encoder 6, and the linear encoder 7 are all electrically connected to the control system, and the data of a rotation angle and a linear displacement are collected via the first rotary encoder 5, the second rotary encoder 6 and the linear encoder 7, with the collected data being useful for analyzing and evaluating the rehabilitation effect.

Figure 7:
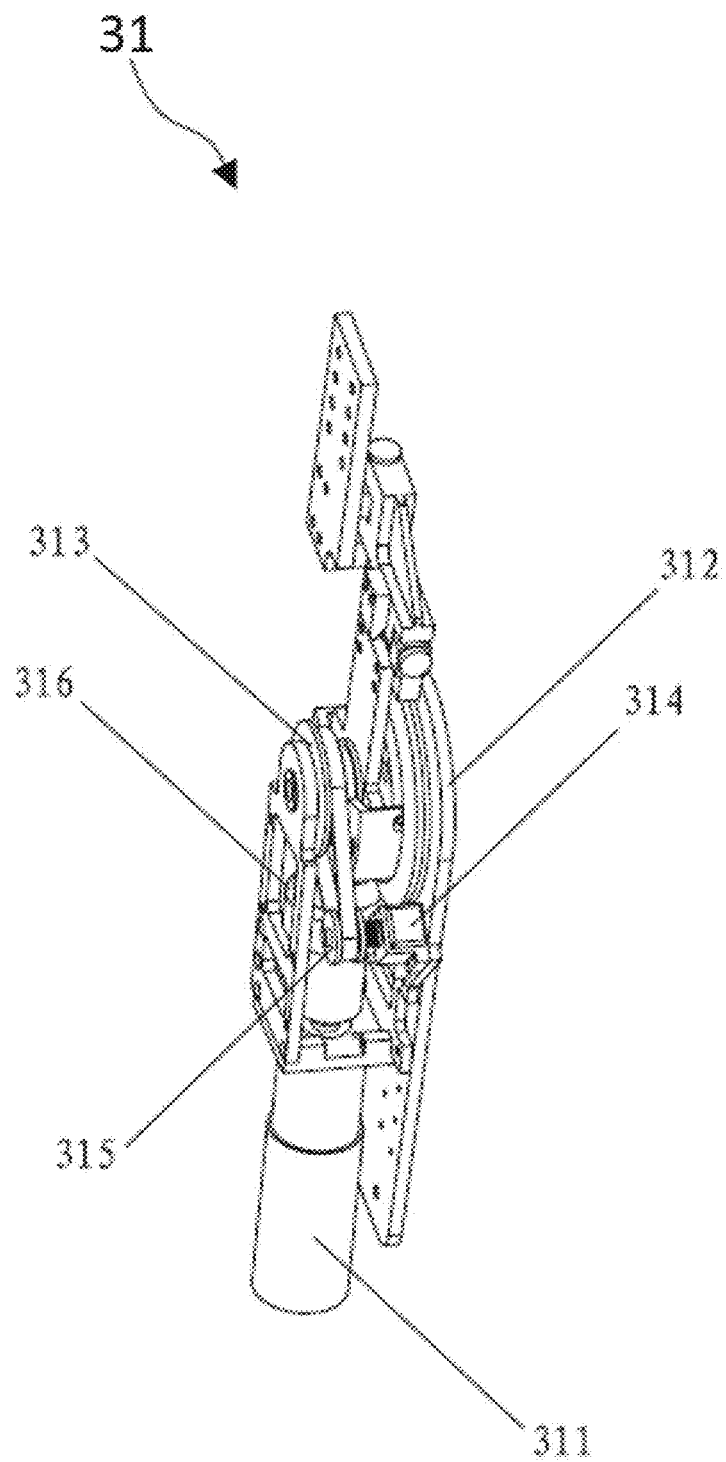
FIG. 7 is a partial schematic structural view of a mechanical leg of FIG. 1.

With reference to FIG. 7, the exoskeleton device 3 comprises two mechanical(prosthetic) legs 31, the top of which are rotatably mounted on the two hip lateral brackets 241 about a direction perpendicular to two sides of the treadmill 4 respectively. The top of the mechanical leg 31 has a rotary power source 311, the first gear plate 312, the second gear plate 313, and a rotating member 314. The first gear plate 312 and the second gear plate 313 are disposed on two sides of the mechanical leg 31, and the first gear plate 312 and the second gear plate 313 are fixedly coupled. One end of the rotating member 314 is fixed on the mechanical leg 31, and the other end of the rotating member 314 is fixed with the third gear plate 315. The second bevel gear 316 is fixed to a power output of the rotary power source 311, and the second bevel gear 316 is in mesh with the first gear plate 312. The second gear plate 313 is drivingly connected to the third gear plate 315 of the rotating member, and the rotary power source 311 is electrically connected to the control system. The control system controls the rotary power source 311 to rotate, the rotation of the rotary power source 311 drives the second bevel gear 316 to rotate, the second bevel gear 316 transmits the rotation to the first gear plate 312 and the second gear plate 313, and the rotation of the second gear plate 313 drives the third gear plate 315 to rotate. Since the third gear plate 315 and the rotating member 314 is an integral structure and the rotating member 314 is fixed on the mechanical leg 31, the rotation of the third gear plate 315 can drive the mechanical leg 31 to rotate in a direction perpendicular to the two sides of the treadmill 4, thereby enabling the swaying of the patient in the fore-and-aft direction during the walking thereof.

Meanwhile, the user can move back or forth relative to the treadmill 4 in coordination with a forward or backward movement of a conveyor belt of the treadmill 4 itself, thereby enabling a free movement of the patient in the fore-and-aft direction.

With reference to FIG. 1, in an embodiment of the present disclosure, the rehabilitation apparatus 100 further comprises handrails 8 disposed on the treadmill 4 and respectively located on the two sides of the treadmill 4 for assisting the patient to stabilize the figure. The rehabilitation apparatus 100 further comprises a bracing 9 and a display 10 for human-computer interaction. The bracing 9 is disposed at a front end of the treadmill 4, and the display 10 is fixed at the top of the bracing 9 and faces a rear end of the treadmill 4. When the patient exercises, a walking environment such as a walkway of a park or a country lane can be simulated by the display 10 for human-computer interaction, so that the exercise of the patient is no longer boring. The rehabilitation device further comprises a system base frame 50 onto which the treadmill 4 is placed.

In summary, as discussed above, the lower limb training rehabilitation apparatus 100 provided by the embodiment of the present disclosure can achieve any movement of the patient in six degrees of freedom, and the pelvis support 24 is kept in parallel to the fore-and-aft direction of the treadmill, so that the patient can have a distinct sense of direction when moving in all available directions, thereby helping the patient to recover the lower limb function more quickly, and enabling the walking posture thereof to be closer to a normal gait. Meanwhile, the rehabilitation apparatus 100 enables human-computer interaction, which can improve the interest and initiative of the patient to exercise.

The above description is directed only to certain preferred embodiments of the present disclosure, and is not intended to limit the present disclosure. Any modifications, equivalent substitutions and improvements and so on made within the spirit and principles of the present disclosure should be included within the scope of protection of the present disclosure.

The invention claimed is:

1. A lower limb training rehabilitation apparatus comprising:
a control system configured for controlling a mechanical movement of the rehabilitation apparatus, and a treadmill configured for the walking of a patient;
a weight reducing device comprising a vertical rail and a power source, wherein the power source is electrically connected with the control system, the vertical rail is located at one side of the treadmill, and a hanging plate protrudes from a side close to the treadmill at the top of the vertical rail;
a pelvis supporting device mounted below the hanging plate and comprising a base, a sliding base, a rotatable guide rail and a pelvis support, wherein the base is mounted on the vertical rail and in connection with an output of the power source, the control system is configured to control the power source to drive the base to reciprocate along the vertical rail; the sliding base is horizontally mounted on the top of the base and is movable in a direction perpendicular to left and right sides of the treadmill, the sliding base is symmetrically provided with a first resilient return element along both sides thereof in a horizontal moving direction, a rotational shaft is disposed at the sliding base in a fore-and-aft direction parallel to the treadmill and the rotational shaft is rotatable about an axis thereof, the center of the rotatable guide rail is rotatably mounted to the rotational shaft about a vertical direction, and a second resilient return element is symmetrically provided at the bottom of the rotatable guide rail, the pelvis support is relatively rotatably mounted to the rotatable guide rail about the vertical direction and is in parallel to a fore-and-aft direction of the treadmill; and an exoskeleton device comprising two mechanical legs, wherein the tops of the two mechanical legs are rotatably mounted to two sides of the pelvis support about a direction perpendicular to left and right sides of the treadmill, respectively.

2. The lower limb training rehabilitation apparatus of claim 1, wherein a boss is fixed to the top of the rotational shaft, a pivot socket is disposed on the top of the boss, and the center of the rotatable guide rail is pivotally mounted within the pivot socket of the boss about the vertical direction.

3. The lower limb training rehabilitation apparatus of claim 2, wherein a second boss is provided at the rotational shaft and a direction of a connecting line of the two bosses is parallel to an axis of the rotational shaft, the rotatable guide rail comprises a first rotatable guide rail and a second rotatable guide rail parallel with each other, and the center of the first rotatable guide rail and the center of the second rotatable guide rail are rotatably disposed within pivot sockets of the two bosses about the vertical direction, respectively.

4. The lower limb training rehabilitation apparatus of claim 3, wherein two sliders are disposed on each of the first rotatable guide rail and the second rotatable guide rail, one slider on the first rotatable guide rail and one slider on the second rotatable guide rail form a first group of sliders, and the other slider on the first rotatable guide rail and the other slider on the second rotatable guide rail form a second group of sliders, the pelvis support comprises two mutually parallel hip lateral brackets and two mutually parallel fixing rods, two rotational receivers both rotatable about the vertical direction are disposed on the top of each of the hip lateral brackets, the two hip lateral brackets are relatively rotatably mounted on the first group of sliders and the second group of sliders about the vertical direction, a first fixing plate and a second fixing plate for limiting the relative position of the two fixing rods are respectively fixed at the center of the first rotatable guide rail and the center of the second rotatable guide rail, both ends of the two fixing rods are respectively disposed in the rotational receivers above the two mutually parallel hip lateral brackets therethrough, and middle portions of the two fixing rods respectively pass through and are limited in the first fixing plate and the second fixing plate, thereby together forming a parallelogram structure.

5. The lower limb training rehabilitation apparatus of claim 4, wherein a gear set is provided on each of the first fixing plate and the second fixing plate, the two fixing rods are guide screws, the two ends of each of the guide screws are provided with reverse threads, and the guide screws are smooth round rods in the middle portions thereof, a threaded through hole is formed in at least one of the rotational receivers, a first bevel gear is fixed on the smooth round rod in the middle portion of each of the two guide screws, the two ends of each of the two guide screws are respectively screwed with the at least one rotational receiver with a threaded through hole, the middle portions of the two guide screws respectively pass through the first fixing plate and the second fixing plate, and the first bevel gears on the two guide screws are respectively in mesh with the gear sets on the first fixing plate and on the second fixing plate, the gear sets on the two fixed plates are in transmission connection.

6. The lower limb training rehabilitation apparatus of claim 5, wherein a crank handle is fixed to one end of one guide screw of the two guide screws.

7. The lower limb training rehabilitation apparatus of claim 5, wherein the rehabilitation apparatus further comprises a first rotary encoder, a second rotary encoder, a linear encoder and a tension-pressure sensor for detecting a force applied to the pelvic support device by the patient, the first rotary encoder is mounted on one side of the rotational shaft, the second rotary encoder is disposed between the first rotatable guide rail and the second rotatable guide rail and drivingly connected to the gear sets on the two fixed plates, the linear encoder is mounted on one side of the sliding base, the tension-pressure sensor is provided on the sliding base, and the first rotary encoder, the second rotary encoder, the linear encoder and the tension-pressure sensor are electrically connected to the control system.

8. The lower limb training rehabilitation of claim 1, wherein the top of the mechanical leg is provided with a rotary power source, a first gear plate, a second gear plate, and a rotating member, the first gear plate and the second gear plate are respectively disposed on two sides of the mechanical leg, and the first gear plate and the second gear plate are fixedly coupled, one end of the rotating member is fixed on the mechanical leg, and the other end of the rotating member is provided with a third gear plate, a second bevel gear is fixed to a power output of the rotary power source, the second bevel gear is in mesh with the first gear plate, the second gear plate is drivingly connected to the third gear plate of the rotating member, and the rotary power source is electrically connected to the control system.

9. The lower limb training rehabilitation apparatus of claim 1, wherein the rehabilitation apparatus further comprises handrails disposed on the treadmill and respectively located on the two sides of the treadmill.

10. The lower limb training rehabilitation apparatus of claim 1, wherein the rehabilitation apparatus further comprises a bracing and a display for human-computer interaction, the bracing is disposed at a front end of the treadmill, and the display is fixed at the top of the bracing and faces towards a rear end of the treadmill.

* * * * *